US012344392B2

(12) United States Patent
Boardman et al.

(10) Patent No.: US 12,344,392 B2
(45) Date of Patent: Jul. 1, 2025

(54) AIRCRAFT FUEL SYSTEM WITH REMOVABLE FUEL TANK

(71) Applicant: Raytheon Technologies Corporation, Farmington, CT (US)

(72) Inventors: Gregory Boardman, Owens Cross Roads, AL (US); Stephen K. Kramer, Cromwell, CT (US)

(73) Assignee: RTX Corporation, Farmington, CT (US)

( * ) Notice: Subject to any disclaimer, the term of this patent is extended or adjusted under 35 U.S.C. 154(b) by 18 days.

(21) Appl. No.: 18/120,828

(22) Filed: Mar. 13, 2023

(65) Prior Publication Data
US 2024/0308680 A1  Sep. 19, 2024

(51) Int. Cl.
*B64D 37/16* (2006.01)
*B64D 37/06* (2006.01)
*B64D 37/30* (2006.01)
*F02C 7/22* (2006.01)
*F02M 37/00* (2006.01)

(52) U.S. Cl.
CPC ............ *B64D 37/16* (2013.01); *B64D 37/06* (2013.01); *B64D 37/30* (2013.01); *F02C 7/22* (2013.01); *F02M 37/0088* (2013.01)

(58) Field of Classification Search
CPC ........ B64D 37/06; B64D 37/16; B64D 37/30; F02C 3/22; F02C 7/22; F02C 9/40; F02M 37/0088; F23R 3/36
See application file for complete search history.

(56) References Cited

U.S. PATENT DOCUMENTS

| | | |
|---|---|---|
| 2013/0306797 A1 | 11/2013 | Dalle Donne |
| 2022/0381185 A1 | 12/2022 | Muldoon |
| 2023/0015930 A1 | 1/2023 | Meshkin Fam |
| 2023/0024316 A1 | 1/2023 | Ribeiro |
| 2023/0122350 A1* | 4/2023 | Minas .............. F02C 7/224 |
| | | 60/39.281 |
| 2023/0212983 A1* | 7/2023 | Sibilli ................ F02C 7/14 |
| | | 60/730 |
| 2023/0340915 A1 | 10/2023 | Speak |

OTHER PUBLICATIONS

EP Search Report for EP Patent Application No. 24151953.7 dated Jun. 11, 2024.

* cited by examiner

*Primary Examiner* — Scott J Walthour
(74) *Attorney, Agent, or Firm* — Getz Balich LLC (57) ABSTRACT

During a method, an aircraft powerplant is provided. The aircraft powerplant includes an injector and a fuel system configured to deliver fuel to the injector. The fuel system includes a first tank, a first circuit and a second circuit arranged in parallel with the first circuit between the first tank and the injector. The second circuit includes a second tank. The fuel is directed from the first tank to the injector during a first mode through the first circuit and independent of the second circuit. The fuel is directed from the second tank to the injector during a second mode through the second circuit and independent of the first circuit.

19 Claims, 6 Drawing Sheets

AIRCRAFT FUEL SYSTEM WITH REMOVABLE FUEL TANK

This invention was made with Government support under DE-AR0001561 awarded by the Department of Energy, Office of ARPA-E. The Government has certain rights in this invention.

BACKGROUND OF THE DISCLOSURE

1. Technical Field

This disclosure relates generally to a turbine engine and, more particularly, to a fuel system for the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Various systems and methods are known in the art for utilizing hydrogen fuel. While these known systems and methods have various advantages, there is still room in the art for improvement.

SUMMARY OF THE DISCLOSURE

According to an aspect of the present disclosure, a method is provided. During this method, an aircraft powerplant is provided. The aircraft powerplant includes an injector and a fuel system configured to deliver fuel to the injector. The fuel system includes a first tank, a first circuit and a second circuit arranged in parallel with the first circuit between the first tank and the injector. The second circuit includes a second tank. The fuel is directed from the first tank to the injector during a first mode through the first circuit and independent of the second circuit. The fuel is directed from the second tank to the injector during a second mode through the second circuit and independent of the first circuit.

According to another aspect of the present disclosure, another method is provided. During this method, a powerplant for an aircraft is provided. The powerplant includes an injector and a fuel system configured to deliver fuel to the injector. The fuel system includes a first tank, a first circuit and a second circuit arranged in parallel with the first circuit between the first tank and the injector. A second tank is installed into the second circuit while the aircraft is parked at an airport terminal. The second tank is filled with the fuel in a gaseous phase. The fuel is directed from the first tank to the injector during a first mode through the first circuit. The fuel is directed from the second tank to the injector during a second mode through the second circuit.

According to still another aspect of the present disclosure, an aircraft powerplant is provided which includes an engine and a fuel system. The engine includes an injector. The fuel system is configured to deliver fuel to the injector. The fuel system includes a first tank, a first circuit and a second circuit that is fluidly coupled in parallel with the first circuit between the first tank and the injector. The second circuit includes a replaceable second tank. The fuel system is configured to direct the fuel from the first tank to the injector through the first circuit independent of the second circuit during a first mode. The fuel system is configured to direct the fuel from the replaceable second tank to the injector through the second circuit independent of the first circuit during a second mode.

The fuel system may be configured to provide the fuel to the injector in a gaseous phase. The first tank may be configured to store the fuel at least primarily in a liquid phase. The second tank may be configured to store the fuel at least primarily in the gaseous phase.

The first circuit may include a flow regulator.

The second circuit may include: a first flow regulator fluidly coupled between the first tank and the second tank; and/or a second flow regulator fluidly coupled between the second tank and the injector.

The fuel system may also include an evaporator fluidly coupled between the first tank and the first circuit and the second circuit. The evaporator may be configured to change a phase of the fuel provided by the first tank from a liquid phase to a gaseous phase.

The method may also include vaporizing the fuel directed from the first tank to the injector during the first mode.

The method may also include directing the fuel into the second tank from a source external from the fuel system.

The method may also include directing the fuel into the second tank from the first tank during the first mode.

The method may also include directing the fuel into the second tank from the first tank during the second mode.

The fuel may not be directed from the second tank to the injector during the first mode.

The fuel may not be directed to the injector through the first circuit during the second mode.

The method may also include exchanging a depleted tank for the second tank.

The second tank may be filled with the fuel prior to the exchanging.

The method may also include: removing the second tank from the aircraft powerplant following the directing of the fuel from the second tank; and replacing the second tank with a replacement tank that is filled with the fuel.

The fuel may be or otherwise include hydrogen fuel.

The fuel contained within the first tank may be in a liquid phase. The fuel contained within the second tank may be in a gaseous phase.

The aircraft powerplant may be configured as or otherwise include a turbine engine.

The aircraft powerplant may be configured as or otherwise include an aircraft propulsion system.

The aircraft powerplant may be configured as or otherwise include an auxiliary power unit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
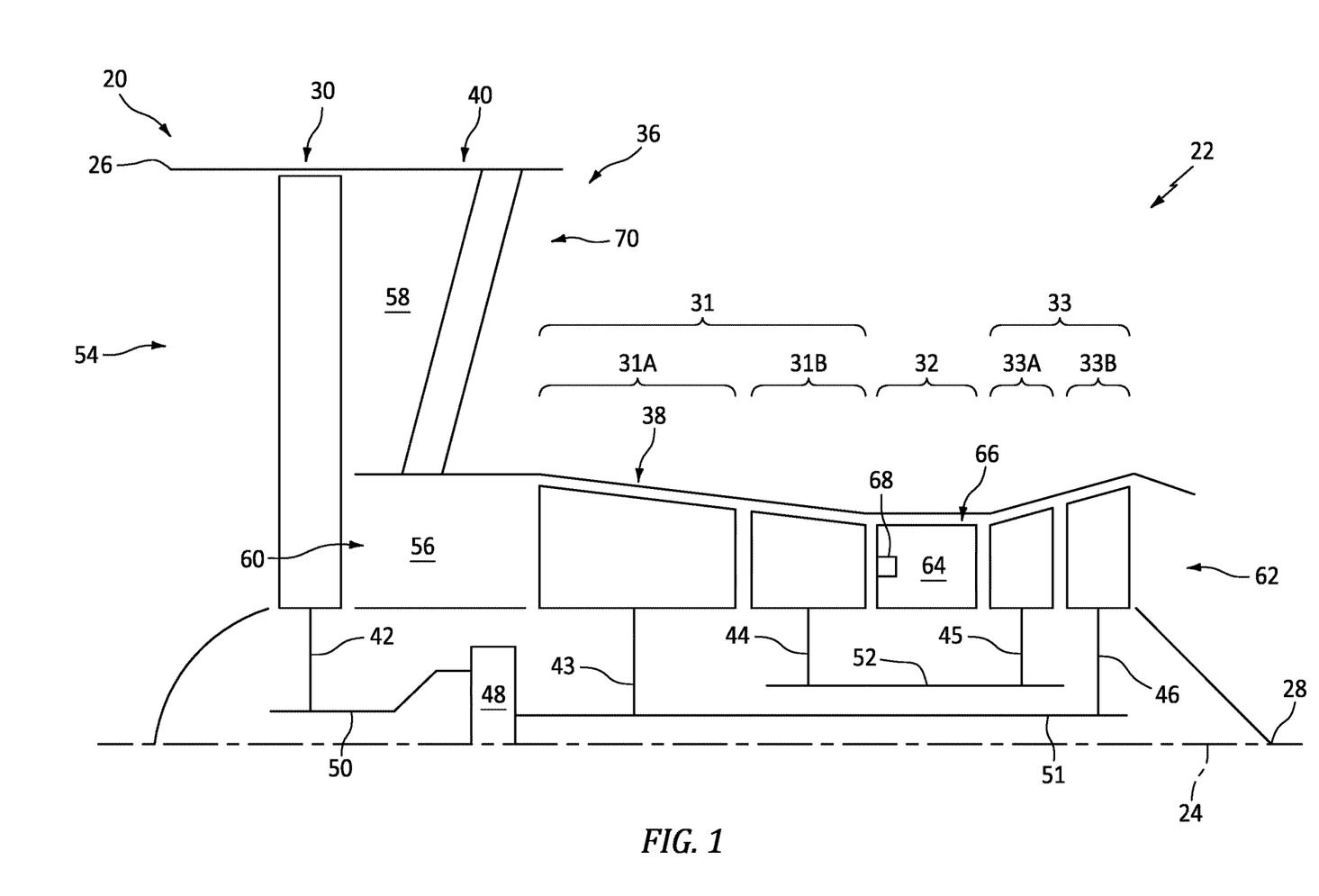
FIG. 1 is a partial schematic illustration of a gas turbine engine.

FIG. 1 is a side sectional illustration of a gas turbine engine 20 for a powerplant 22 for an aircraft. The aircraft powerplant 22 of FIG. 1 is configured as a propulsion system for the aircraft. The aircraft powerplant 22, however, is not limited to such an exemplary configuration. For example, the aircraft powerplant 22 may also or alternatively be configured as or otherwise include a power system for the aircraft. However, for ease of description, the aircraft powerplant 22 may be described below as the aircraft propulsion system.

The turbine engine 20 of FIG. 1 extends axially along an axial centerline 24 between a forward, upstream end 26 and an aft, downstream end 28. The turbine engine 20 includes a fan section 30, a compressor section 31, a combustor section 32 and a turbine section 33. The compressor section 31 of FIG. 1 includes a low pressure compressor (LPC) section 31A and a high pressure compressor (HPC) section 31B. The turbine section 33 of FIG. 1 includes a high pressure turbine (HPT) section 33A and a low pressure turbine (LPT) section 33B.

The engine sections 30-33B of FIG. 1 are arranged sequentially along the axial centerline 24 within an engine housing 36. This engine housing 36 includes an inner case 38 (e.g., a core case) and an outer case 40 (e.g., a fan case). The inner case 38 may house one or more of the engine sections 31A-33B; e.g., a core of the turbine engine 20. The outer case 40 may house at least the fan section 30.

Each of the engine sections 30, 31A, 31B, 33A and 33B includes a respective bladed rotor 42-46. Each of these bladed rotors 42-46 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 42 is connected to a geartrain 48, for example, through a fan shaft 50. The geartrain 48 and the LPC rotor 43 are connected to and driven by the LPT rotor 46 through a low speed shaft 51. The HPC rotor 44 is connected to and driven by the HPT rotor 45 through a high speed shaft 52. The engine shafts 50-52 are rotatably supported by a plurality of bearings; e.g., rolling element and/or thrust bearings. Each of these bearings is connected to the engine housing 36 by at least one stationary structure such as, for example, an annular support strut.

During engine operation, air enters the turbine engine 20 through an airflow inlet 54 into the turbine engine 20. This air is directed through the fan section 30 and into a core flowpath 56 and a bypass flowpath 58. The core flowpath 56 extends sequentially through the engine sections 31A-33B (e.g., the engine core) from an inlet 60 into the core flowpath 56 to an exhaust 62 from the core flowpath 56. The air within the core flowpath 56 may be referred to as "core air". The bypass flowpath 58 extends through a bypass duct, and bypasses the engine core. The air within the bypass flowpath 58 may be referred to as "bypass air".

The core air is compressed by the LPC rotor 43 and the HPC rotor 44 and directed into a (e.g., annular) combustion chamber 64 of a (e.g., annular) combustor 66 in the combustor section 32. Fuel is injected by one or more fuel injector assemblies 68 (one visible in FIG. 1) into the combustion chamber 64 and mixed with the compressed core air to provide a fuel-air mixture. This fuel-air mixture is ignited and combustion products thereof flow through and sequentially cause the HPT rotor 45 and the LPT rotor 46 to rotate before being directed out of the turbine engine 20 through the core exhaust 62. The rotation of the HPT rotor 45 and the LPT rotor 46 respectively drive rotation of the HPC rotor 44 and the LPC rotor 43 and, thus, compression of the air received from the core inlet 60. The rotation of the LPT rotor 46 also drives rotation of the fan rotor 42, which propels the bypass air through the bypass flowpath 58 and out of the turbine engine 20 through an exhaust 70 from the bypass flowpath 58. The propulsion of the bypass air may account for a majority of thrust generated by the aircraft propulsion system and its turbine engine 20.

Figure 2:
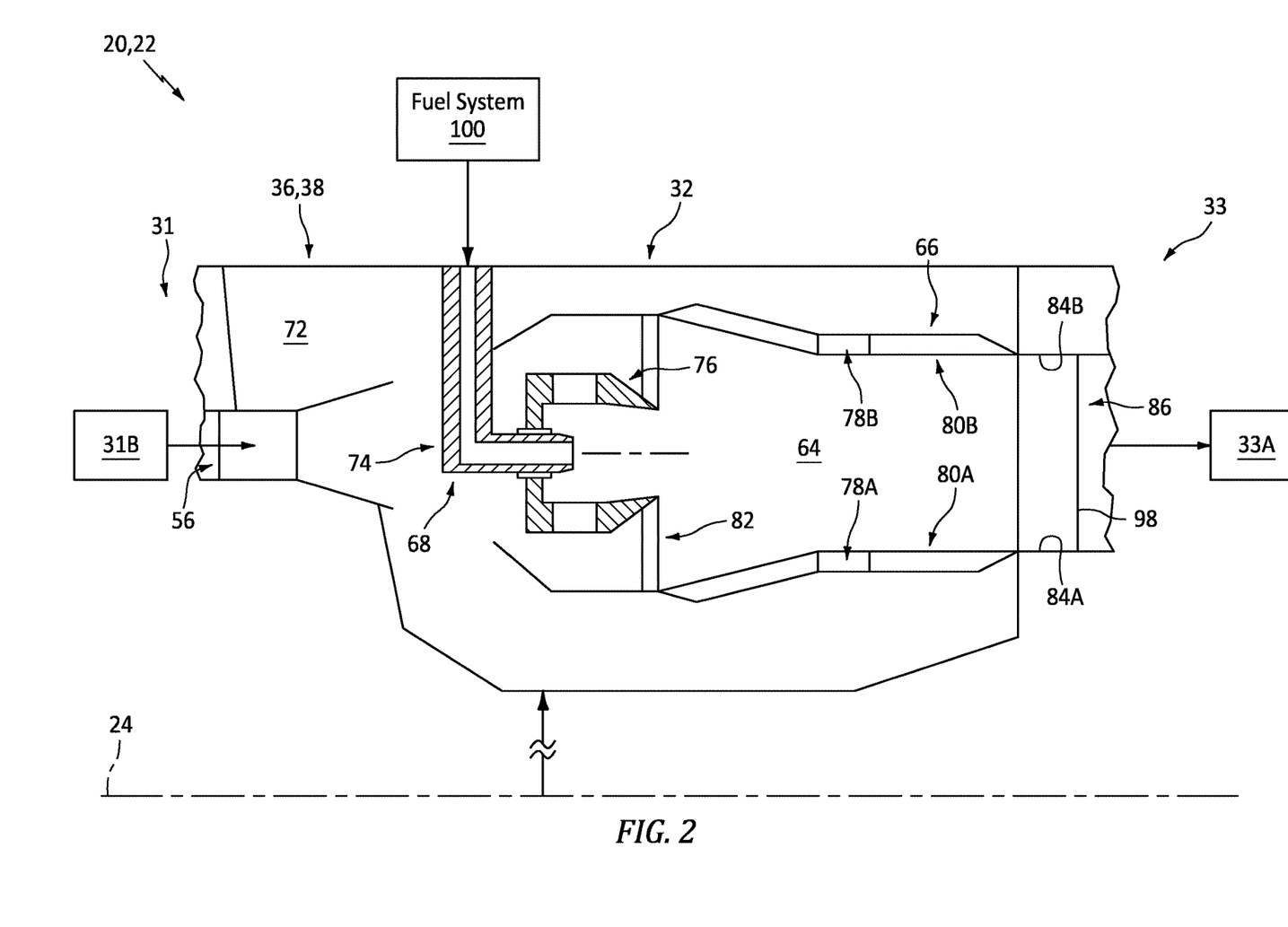
FIG. 2 is a partial schematic illustration of a combustor section between a compressor section and a turbine section.

FIG. 2 illustrate a portion of the combustor section 32 along the core flowpath 56 between the HPC section 31B and the HPT section 33A. This combustor section 32 includes the combustor 66, a diffuser plenum 72 and the one or more injector assemblies 68 (one visible in FIG. 2). Briefly, the combustor 66 is disposed within (e.g., surrounded by) the diffuser plenum 72. This diffuser plenum 72 receives the compressed core air from the HPC section 31B for subsequent provision into the combustion chamber 64. Each injector assembly 68 of FIG. 2 includes a fuel injector 74 mated with an air swirler structure 76. The fuel injector 74 injects the fuel into the combustion chamber 64. The air swirler structure 76 directs some of the core air from the diffuser plenum 72 into the combustion chamber 64 in a manner that facilitates mixing the core air with the injected fuel. One or more igniters (not shown) ignite the fuel-air mixture within the combustion chamber 64. One or more quench apertures 78A, 78B (generally referred to as "78") (e.g., dilution holes) in each wall 80A, 80B (generally referred to as "80") of the combustor 66 direct additional core air from the diffuser plenum 72 into the combustion chamber 64 to quench (e.g., stoichiometrically lean) the combustion products; e.g., the ignited fuel-air mixture.

Figure 3:
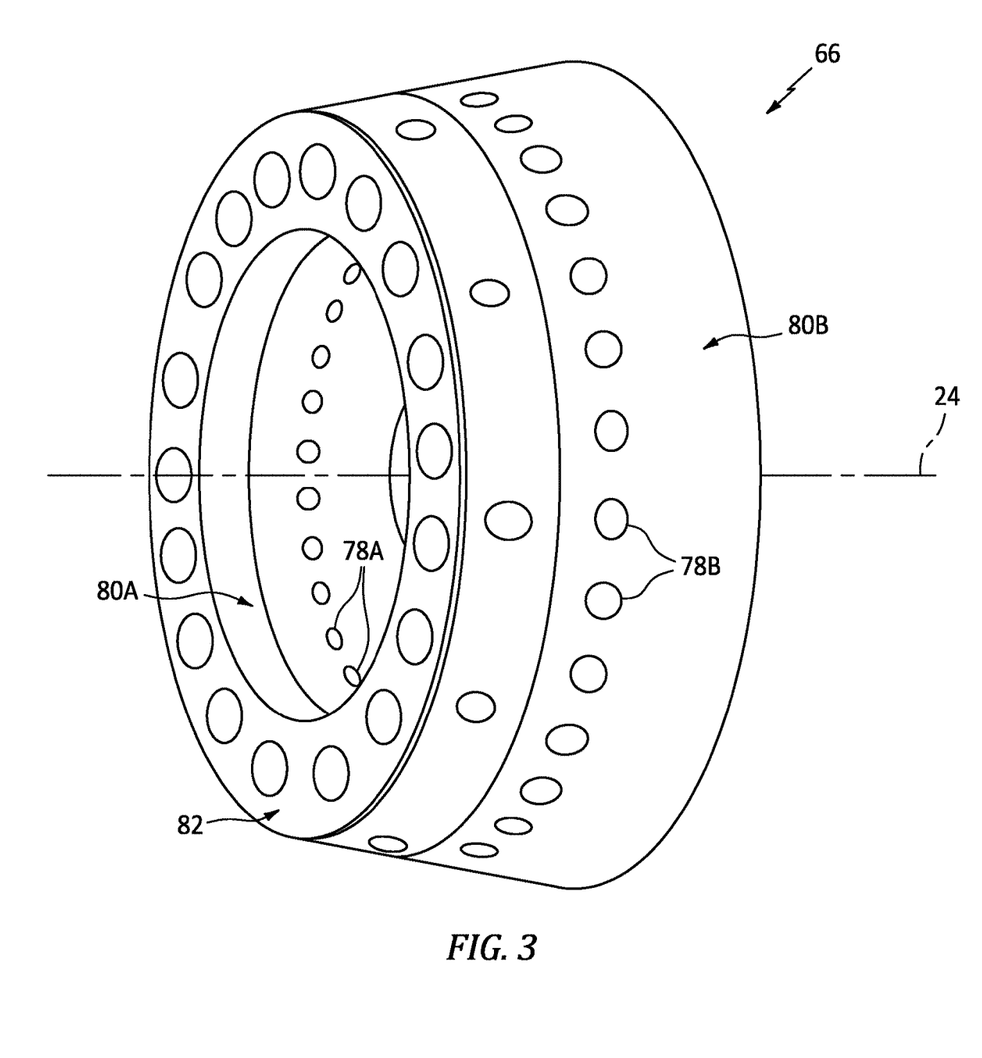
FIG. 3 is a perspective illustration of a combustor.

The combustor 66 may be configured as an annular combustor; e.g., an annular floating wall combustor. The combustor 66 of FIGS. 2 and 3, for example, includes an annular combustor bulkhead wall 82 ("bulkhead"), the tubular inner combustor wall 80A ("inner wall"), and the tubular outer combustor wall 80B ("outer wall"). The bulkhead 82 of FIG. 2 extends radially between and to the inner wall 80A and the outer wall 80B. The bulkhead 82 may be connected (e.g., mechanically fastened or otherwise attached) to the inner wall 80A and/or the outer wall 80B. Each combustor wall 80 projects axially along the axial centerline 24 out from the bulkhead 82 towards the HPT section 33A. The inner wall 80A of FIG. 2, for example, projects axially to and may be connected to an inner platform 84A of a downstream stator vane array 86 in the HPT section 33A. The outer wall 80B of FIG. 2 projects axially to and may be connected to an outer platform 84B of the stator vane array 86. With the arrangement of FIG. 2, the combustion chamber 64 is formed by and extends radially within the combustor 66 between and to the inner wall 80A and the outer wall 80B. The combustion chamber 64 is formed by and extends axially (in an upstream direction along the core flowpath 56) into the combustor 66 from the stator vane array 86 to the bulkhead 82. The combustion chamber 64 also extends within the combustor 66 circumferentially about (e.g., completely around) the axial centerline 24, which may configure the combustion chamber 64 as a full-hoop annulus.

Figure 4:
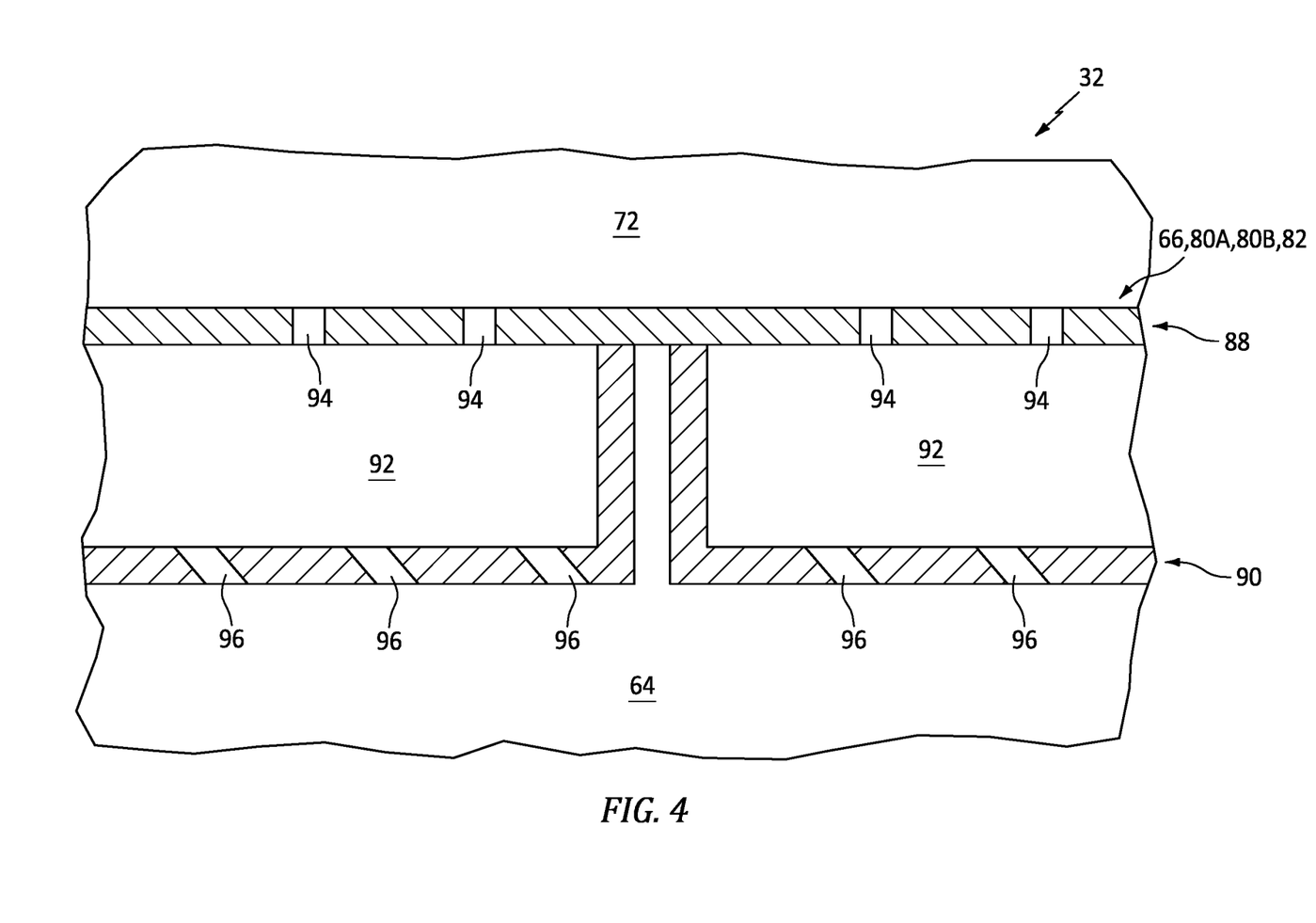
FIG. 4 is a partial sectional illustration of a combustor wall.

Referring to FIG. 4, any one or more or all of the walls 80A, 80B and/or 82 may each be configured as a multi-walled structure; e.g., a hollow, dual-walled structure. Each wall 80A, 80B, 82 of FIG. 4, for example, includes a combustor wall shell 88, a combustor wall heat shield 90 (e.g., a liner) and one or more combustor wall cooling cavities 92 (e.g., impingement cavities) formed by and (e.g., radially and/or axially) between the shell 88 and the heat shield 90. Each cooling cavity 92 of FIG. 4 is fluidly coupled with the diffuser plenum 72 through one or more cooling apertures 94 in the shell 88; e.g., impingement apertures. Each cooling cavity 92 of FIG. 4 is fluidly coupled with the combustion chamber 64 through one or more cooling apertures 96 in the heat shield 90; e.g., effusion apertures. Of course, various other multi-walled combustor wall structures are known in the art, and the present disclosure is not limited to any particular ones thereof. Furthermore, it is contemplated any one or more or all of the walls 80A, 80B and/or 82 of FIG. 2 may each alternatively be configured as a single-walled structure. The shell 88 of FIG. 4, for example, may be omitted and the heat shield 90 may form a single walled liner/wall. However, for ease of description, each wall 80A, 80B, 82 may each be described below as the hollow, dual-walled structure.

Referring to FIG. 2, the stator vane array 86 includes the inner platform 84A, the outer platform 84B and a plurality of stator vanes 98 (one visible in FIG. 2). The stator vanes 98 are arranged circumferentially about the axial centerline 24 in an array; e.g., a circular array. Each of these stator vanes 98 extends radially across the core flowpath 56 between and to the inner platform 84A and the outer platform 84B. Each of the stator vanes 98 may also be connected to the inner platform 84A and/or the outer platform 84B. The stator vane array 86 and its stator vanes 98 are configured to turn and/or otherwise condition the combustion products exiting the combustion chamber 64 for interaction with a first stage of the HPT rotor 45 (see FIG. 1).

Figure 5:
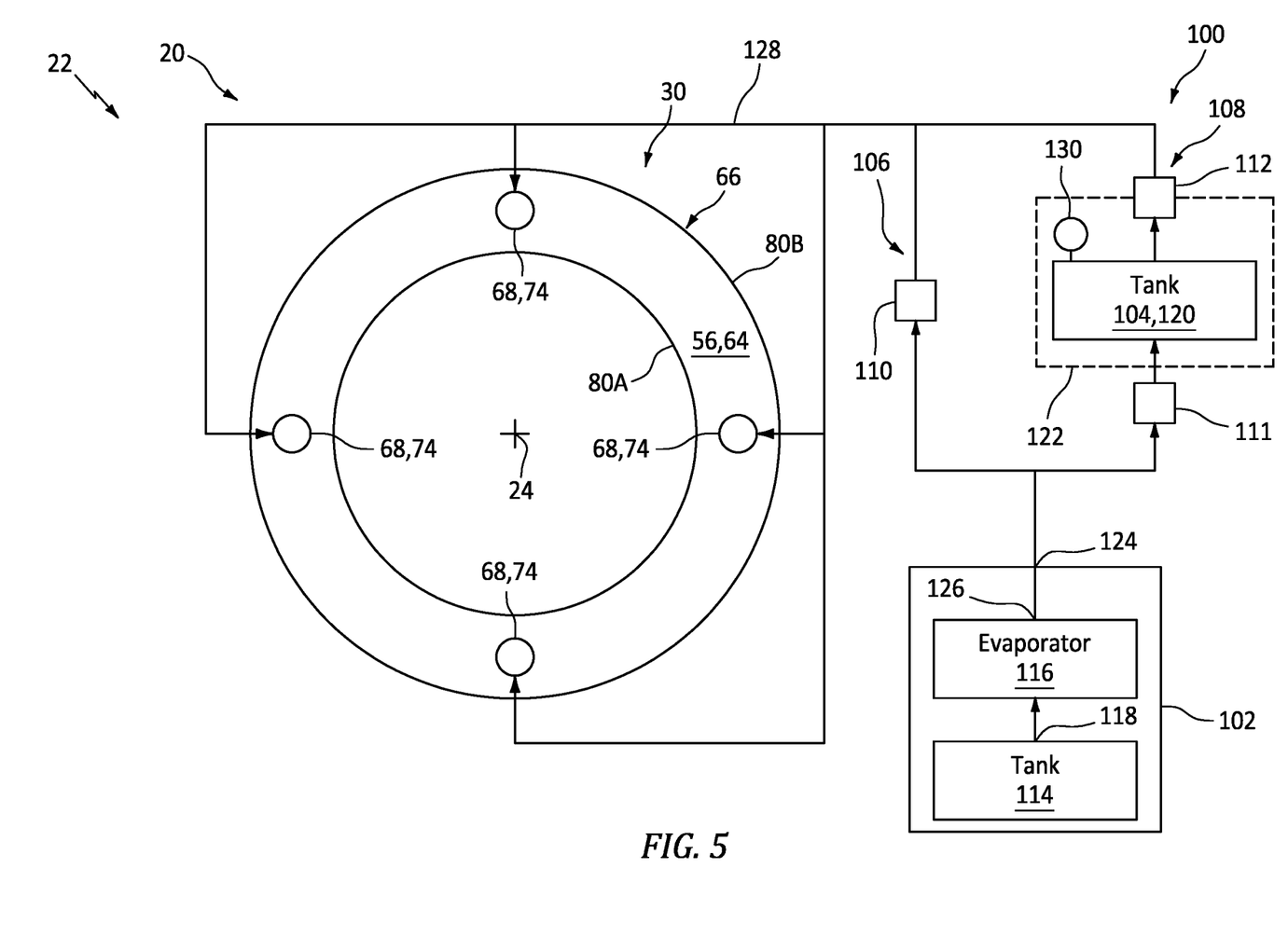
FIG. 5 is a schematic illustration of a fuel system configured with the combustor section.

Referring to FIG. 5, the aircraft powerplant 22 includes a fuel system 100 configured to deliver the fuel to the fuel injectors 74. This fuel system 100 includes a primary (e.g., main) fuel source 102 and a secondary (e.g., startup, auxiliary, etc.) fuel source 104. The fuel system 100 also includes a plurality of parallel fuel circuits 106 and 108 and one or more fuel flow regulators 110-112. Briefly, each of the fuel flow regulators 110-112 may be configured as or otherwise include a control valve, a pump, a compressor and/or any other device operable to selectively control flow of fuel therethrough. However, for ease of description, the fuel flow regulators 110-112 may be described below as control valves.

The primary fuel source 102 of FIG. 5 includes a primary tank 114. This primary tank 114 is configured to store the fuel before, during and/or after turbine engine operation. Here, the fuel may be stored within the primary tank 114 primarily (e.g., at least eighty or ninety percent) or completely in a liquid phase; e.g., liquid fuel. The primary tank 114, for example, may be configured as or otherwise include a tank, a cylinder, a pressure vessel, a bladder or any other type of fuel storage container. The primary tank 114 may also be configured as a substantially permanent installation in the aircraft. Herein, the term "permanent" may describe a tank which is installed with the aircraft, for example, during initial aircraft assembly and may (e.g., only) be removed from the aircraft during an aircraft overhaul, etc. within an aircraft maintenance facility such as, but not limited to, an airport repair hanger. The present disclosure, however, is not limited to such an exemplary permanent primary tank installation.

The primary fuel source 102 may also include an evaporator 116. Examples of the evaporator 116 include, but are not limited to, a fluid-to-fluid heat exchanger and/or an electric heater. The evaporator 116 is fluidly coupled with and downstream of an outlet 118 from the primary tank 114. This evaporator 116 is configured to receive the fuel from the primary tank 114 in the liquid phase, and evaporate at least some or all of that fuel into a gaseous phase.

The secondary fuel source 104 of FIG. 5 is configured as, or may otherwise include, a secondary tank 120. This secondary tank 120 is configured to store the fuel before, during and/or after turbine engine operation. Here, the fuel may be stored within the secondary tank 120 primarily (e.g., at least eighty or ninety percent) or completely in the gaseous phase; e.g., gaseous fuel. The secondary tank 120, for example, may be configured as or otherwise include a tank, a cylinder, a pressure vessel, a bladder or any other type of fuel storage container. The secondary tank 120 may also be configured as a readily removable installation in the aircraft. Herein, the term "removable" may describe a tank which may be relatively easily installed with and/or removed from the aircraft after initial aircraft assembly. The secondary tank 120, for example, may be readily accessible through a wing, fuselage or nacelle panel 122. The secondary tank 120 may thereby be relatively easily installed with and/or removed from the aircraft while, for example, the aircraft is parked at an airport terminal. This may facilitate installation or removal (e.g., replacement, exchange, etc.) of the secondary tank 120 before, during and/or after passenger boarding and/or deboarding and/or cargo loading and/or unloading. As described below in further detail, this secondary tank installation/removal may occur prior to or after each flight, or prior to or after select flights on an as-needed basis.

The primary and the secondary circuits 106 and 108 are arranged and fluidly coupled in parallel between an outlet 124 from the primary fuel source 102 and the one or more fuel injectors 74. More particularly, the primary and the secondary circuits 106 and 108 of FIG. 5 are arranged and fluidly coupled in parallel between an outlet 126 from the evaporator 116 and an inlet to a manifold 128 which fluidly couples the fuel system 100 to each of the fuel injectors 74. The primary circuit 106 includes the primary circuit flow regulator 110. The secondary circuit 108 includes the secondary tank 120 and the secondary circuit flow regulators 111 and 112. The secondary tank 120 of FIG. 5 is arranged inline between and fluidly coupled with the secondary circuit upstream flow regulator 111 and the secondary circuit downstream flow regulator 112. With this arrangement, the flow regulators 110-112 may selectively direct the fuel from the fuel tank(s) 114, 120 to the fuel injectors 74.

During a first mode of operation, the primary circuit flow regulator 110 may open to direct the gaseous fuel from the primary fuel source 102 and its primary tank 114 to the fuel injectors 74 through the primary circuit 106, for example independent of (e.g., not requiring flow through) the secondary circuit 108. During this first mode, both the secondary circuit flow regulators 111 and 112 may close to prevent (or reduce) flow of the fuel from the primary fuel source 102 into the secondary tank 120 and/or prevent (or reduce) flow of the fuel from the secondary tank 120 to the fuel injectors 74. Under certain conditions, however, the secondary circuit upstream flow regulator 111 may open to also direct the fuel from the primary fuel source 102 into the secondary tank 120. The secondary tank 120 may thereby be filled (e.g., refilled, charged, etc.) when there is excess gaseous fuel output available from the primary fuel source 102; e.g., during aircraft cruise and/or other medium or low thrust conditions/maneuvers. Under certain conditions, the secondary circuit downstream flow regulator 112 may alternatively open to also direct the fuel from the secondary tank 120 to the fuel injectors 74. The secondary tank 120 may thereby provide supplemental fuel to the fuel injectors 74 when needed; e.g., aircraft takeoff and/or other high thrust conditions/maneuvers. Of course, it is contemplated both of the secondary circuit flow regulators 111 and 112 may open to varying degrees to both facilitate filling the secondary tank 120 as well as providing supplemental fuel to the fuel injectors 74.

During a second mode of operation, the secondary circuit downstream flow regulator 112 may open to direct the gaseous fuel from the secondary tank 120 to the fuel injectors 74 through the secondary circuit 108, for example independent of the primary circuit 106. During this second mode, the primary circuit flow regulator 110 and the secondary circuit upstream flow regulator 111 may both close to prevent (or reduce) flow of the fuel from the primary fuel source 102 into the secondary tank 120 and/or prevent (or reduce) flow of the fuel from the primary fuel source 102 to the fuel injectors 74. This second mode may be initiated, for example, at turbine engine startup, for initial turbine engine operation and/or other conditions where the gaseous phase of the fuel may not yet be available (at all or in enough quantity) from the primary fuel source 102; e.g., before warmup of the evaporator 116. Under certain conditions, however, the primary circuit flow regulator 110 may open to also direct the fuel from the primary fuel source 102 to the fuel injectors 74. The primary fuel source 102 may thereby provide additional gaseous fuel to the fuel injectors 74 when available.

With the foregoing configuration, the secondary tank 120 may function as an accumulator and provide on-demand gaseous fuel to the fuel injectors 74 when needed. Where the aircraft is operated for relatively long flights such that there is enough time to refill the secondary tank 120 after use, that secondary tank 120 may be used for another subsequent flight without requiring replacement or refilling on ground. However, where the aircraft is operated for relatively short flights such that there is not enough time to (e.g., completely or partially above a threshold) refill the secondary tank 120 after use, that secondary tank 120 may be refilled by an external source while the aircraft is on ground and/or the secondary tank 120 may be replaced by another filled (e.g., charged) secondary tank 120; e.g., a replacement tank. Time on ground may thereby be minimized while maintaining full fuel delivery functionality.

In some embodiments, the secondary tank 120 may be provided with a pressure gauge 130. This pressure gauge 130 may facilitate ground personnel to readily ascertain the fuel level in the secondary tank 120 and assess whether or not the secondary tank 120 should be refilled or replaced (e.g., exchanged) before the next flight. Of course, indicators to refill or replace the secondary tank 120 may also or alternatively be provided by automated signals.

The fuel delivered by the fuel system 100 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The turbine engine 20 of FIG. 1, for example, may be configured as a multi-fuel turbine engine; e.g., a dual-fuel turbine engine. However, for ease of description, the fuel delivered by the fuel system 100 is generally described herein as the non-hydrocarbon fuel; e.g., the hydrogen fuel.

Figure 6:
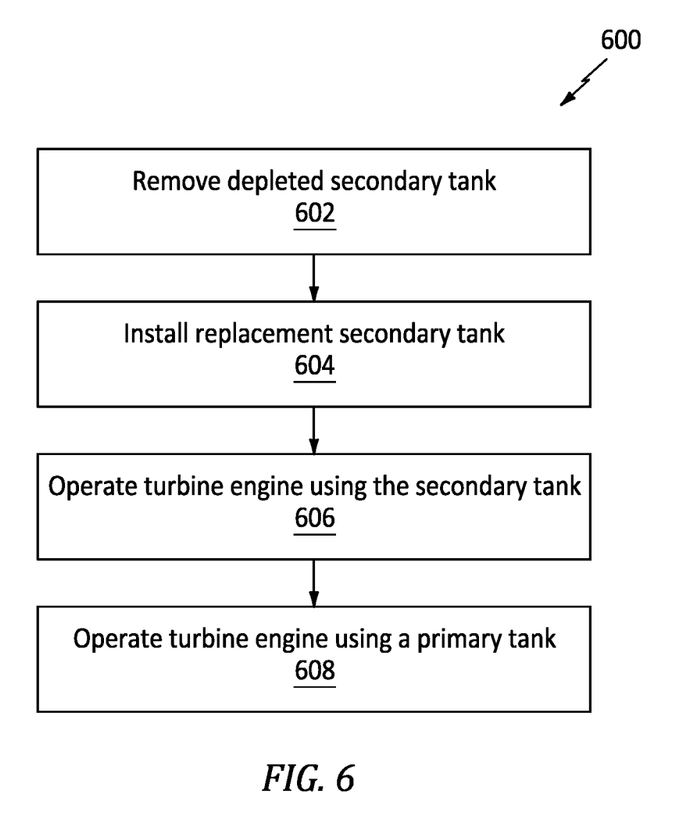
FIG. 6 is a flow diagram of a method for the gas turbine engine.

FIG. 6 is a flow diagram of a method 600 for an aircraft and its powerplant. For ease of description, the method 600 may be described below with reference to the turbine engine 20 of FIG. 1 and the fuel system 100 of FIG. 5. The method 600 of the present disclosure, however, is not limited to such an exemplary aircraft powerplant configuration.

In step 602, a depleted secondary tank 120 is removed from the aircraft. More particularly, a secondary tank 120 that is empty or has a fuel level below a threshold is removed from the fuel system 100. This removal of the depleted secondary tank 120 may be performed while the aircraft is being deboarded/unloaded and/or boarded/loaded at, for example, an airport gate or, more generally, at an airport terminal.

In step 604, a filled (e.g., charged) secondary tank 120 is installed with the aircraft. More particularly, a secondary tank 120 that is filled with gaseous fuel is installed with the fuel system 100 to replace the depleted secondary tank 120 that was removed in the step 602. Thus, the depleted secondary tank 120 is exchanged for the filled secondary tank 120. The installation of the filled secondary tank 120 may also be performed while the aircraft is being deboarded/unloaded and/or boarded/loaded at, for example, the airport gate or, more generally, at the airport terminal.

In step 606, the turbine engine 20 is warmed up and/or initially operated with the fuel system 100 in the second mode. Thus, while the evaporator 116 is warming up to facilitate provision of the gaseous fuel from the primary fuel source 102, at least (or only) the secondary tank 120 supplies the gaseous fuel to the fuel injectors 74.

In step 608, the turbine engine 20 is operated with the fuel system 100 in the first mode. More particularly, once the evaporator 116 is warmed up and the primary fuel source 102 may provide enough of the gaseous fuel for turbine engine operation, the mode may be switched from the second (e.g., secondary tank) mode to the first (e.g., primary tank) mode. Here, at least (or only) the primary fuel source 102 supplies the gaseous fuel to the fuel injectors 74 (without requiring use of the secondary circuit 108).

When the primary fuel source 102 is operable to supply more gaseous fuel than is needed for current operation of the turbine engine 20, the secondary circuit upstream flow regulator 111 may be opened to facilitate filling (e.g., charging) of the secondary tank 120 following its at least partial or complete depletion during the step 606. Where the secondary tank 120 can be refilled completely or past its threshold level, this secondary tank 120 may then be used for a subsequently aircraft flight without requiring refilling and/or replacement while the aircraft is on ground. However, where the aircraft lands before the secondary tank 120 can be refilled completely or past its threshold level, the now depleted secondary tank 120 can be exchanged as outlined in the steps 602 and 604 above, or alternatively refilled from an external gaseous fuel source outside of the aircraft.

The fuel system 100 and its removable secondary tank 120 may be configured for various turbine engines other than the one described above. The fuel system 100, for example, may be configured for a geared turbine engine where a geartrain connects one or more shafts to one or more rotors in a fan section, a compressor section and/or any other engine section. Alternatively, the fuel system 100 may be configured for a turbine engine without a geartrain; e.g., a direct drive turbine engine. The fuel system 100 may be configured for a geared or non-geared turbine engine with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or otherwise where the powerplant 22 is a power system for the aircraft. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:
providing an aircraft powerplant, the aircraft powerplant including an injector and a fuel system configured to deliver a first fuel, a second fuel, or both the first fuel and the second fuel, to the injector, the fuel system including a first tank, a first circuit, and a second circuit arranged in parallel with the first circuit between the first tank and the injector, and the second circuit comprising a second tank and an upstream flow regulator that is upstream of the second tank, wherein an evaporator is positioned downstream from the first tank and upstream from the first circuit and the second circuit, the evaporator configured to convert the first fuel from the first tank from a liquid phase to a gaseous phase, the upstream flow regulator fluidly coupled with the evaporator and configured to receive the first fuel from the evaporator and selectively direct the first fuel to the second tank, and wherein the first circuit is configured such that fuel flowing in the first circuit bypasses the second tank;
directing the first fuel from the first tank to the injector during a first mode through the first circuit and independent of the second circuit; and
directing the second fuel from the second tank to the injector during a second mode through the second circuit and independent of the first circuit.

2. The method of claim 1, further comprising directing the second fuel into the second tank from a source external from the fuel system.

3. The method of claim 1, further comprising directing the first fuel into the second tank from the first tank during the first mode.

4. The method of claim 1, further comprising directing the first fuel into the second tank from the first tank during the second mode.

5. The method of claim 1, wherein the first fuel is not directed from the second tank to the injector during the first mode.

6. The method of claim 1, wherein the first fuel is not directed to the injector through the first circuit during the second mode.

7. The method of claim 1, further comprising:
exchanging a depleted tank for the second tank;
wherein the second tank is filled with the second fuel prior to the exchanging.

8. The method of claim 1, further comprising:
removing the second tank from the aircraft powerplant following the directing of the second fuel from the second tank; and
replacing the second tank with a replacement tank that is filled with the second fuel.

9. The method of claim 1, wherein the second fuel comprises hydrogen fuel.

10. The method of claim 1, wherein
the first fuel contained within the first tank is in a liquid phase; and
the second fuel contained within the second tank is in a gaseous phase.

11. The method of claim 1, wherein the aircraft powerplant comprises a turbine engine.

12. The method of claim 1, wherein the aircraft powerplant comprises an aircraft propulsion system.

13. The method of claim 1, wherein the aircraft powerplant comprises an auxiliary power unit.

14. A method, comprising:
providing an aircraft including an aircraft powerplant, the aircraft powerplant including an injector and a fuel system configured to deliver a first fuel, a second fuel, or both the first fuel and the second fuel, to the injector, the fuel system including a first tank, a first circuit and a second circuit arranged in parallel with the first circuit between the first tank and the injector, and the second circuit comprising a second tank and an upstream flow regulator that is upstream of the second tank, wherein an evaporator is positioned downstream from the first tank and upstream from the first circuit and the second circuit, the evaporator configured to convert the first fuel from the first tank from a liquid phase to a gaseous phase, the upstream flow regulator fluidly coupled with the evaporator and configured to receive the first fuel from the evaporator and selectively direct the first fuel to the second tank, and wherein the first circuit is configured such that fuel flowing in the first circuit bypasses the second tank;
installing a second tank into the second circuit while the aircraft is parked at an airport terminal, wherein the second tank is filled with the fuel in a gaseous phase;
directing the first fuel from the first tank to the injector during a first mode through the first circuit and independent of the second circuit; and
directing the second fuel from the second tank to the injector during a second mode through the second circuit and independent of the first circuit.

15. The method of claim 14, further comprising vaporizing the first fuel directed from the first tank to the injector during the first mode.

16. An aircraft powerplant, comprising:
an engine comprising an injector; and
a fuel system configured to deliver a first fuel, a second fuel, or both the first fuel and the second fuel, to the injector, the fuel system including a first tank, a first circuit and a second circuit that is fluidly coupled in parallel with the first circuit between the first tank and the injector, and the second circuit comprising a replaceable second tank and an upstream flow regulator that is upstream of the replaceable second tank, wherein an evaporator is positioned downstream from the first tank and upstream from the first circuit and the second circuit, the evaporator configured to convert the first fuel from the first tank from a liquid phase to a gaseous phase, the upstream flow regulator fluidly coupled with the evaporator and configured to receive the first fuel from the evaporator and selectively direct the first fuel to the replaceable second tank, and wherein the first circuit is configured such that fuel flowing in the first circuit bypasses the replaceable second tank;

the fuel system configured to direct the first fuel from the first tank to the injector through the first circuit independent of the second circuit during a first mode; and the fuel system configured to direct the second fuel from the replaceable second tank to the injector through the second circuit independent of the first circuit during a second mode.

17. The aircraft powerplant of claim 16, wherein the fuel system is configured to provide the first fuel and the second fuel to the injector in the gaseous phase; the first tank is configured to store the first fuel substantially in the liquid phase; and the second tank is configured to store the second fuel substantially in the gaseous phase.

18. The aircraft powerplant of claim 16, wherein the first circuit comprises a second flow regulator.

19. The aircraft powerplant of claim 16, wherein the second circuit further comprises a second flow regulator fluidly coupled between the second tank and the injector.

* * * * *